Figure 3:
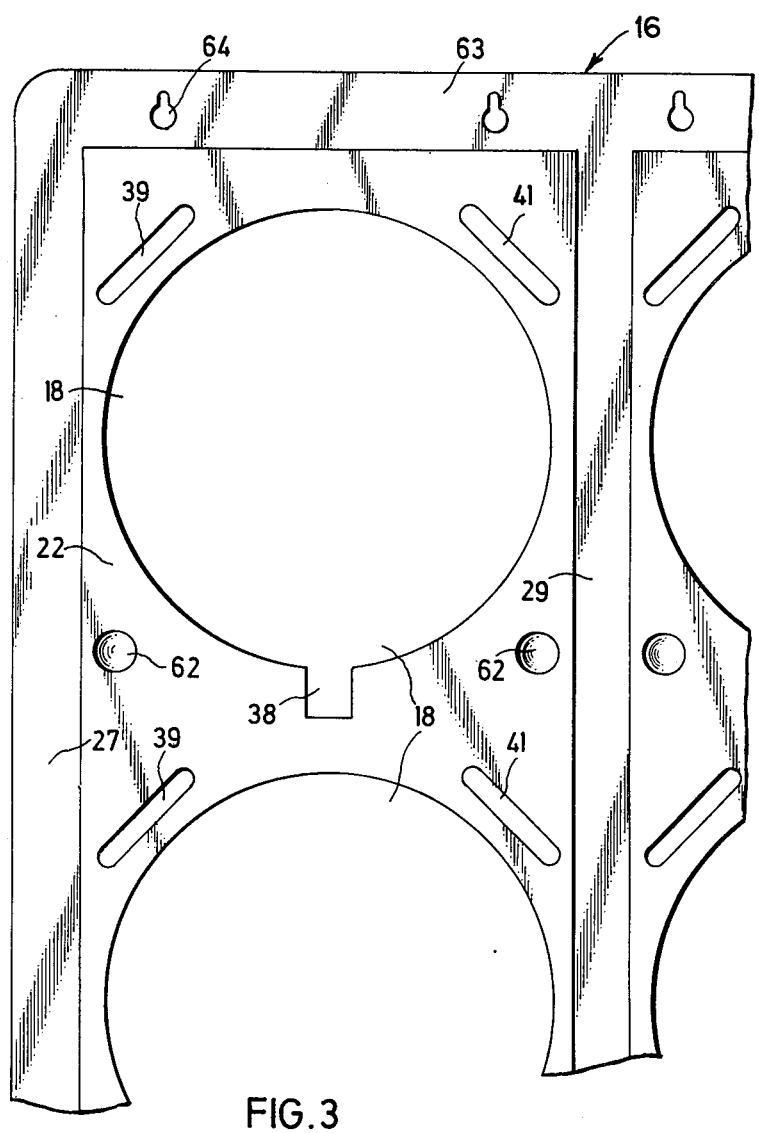

United States Patent [19]

de Bruin

[11] 4,189,858
[45] Feb. 26, 1980

[54] APPARATUS FOR JOINTLY EXAMINING AND DEPOSITING A PLURALITY OF TRANSPARENT PICTURES

[76] Inventor: Frank de Bruin, Kalk-Muhlheimer Strasse 400, 5 Koln 80, Fed. Rep. of Germany

[21] Appl. No.: 917,852

[22] Filed: Jun. 22, 1978

Related U.S. Application Data

[63] Continuation of Ser. No. 723,703, Sep. 16, 1976, abandoned.

[30] Foreign Application Priority Data

Sep. 17, 1975 [DE] Fed. Rep. of Germany ....... 2541326

[51] Int. Cl.² .............................................. G09F 1/10
[52] U.S. Cl. .................................. 40/158 B; 40/159; 40/405
[58] Field of Search ..................... 40/158 B, 158, 159, 40/156, 361, 363, 365, 366, 367, 404, 405, 124.2

[56] References Cited

U.S. PATENT DOCUMENTS

| | | | |
|---|---|---|---|
| 386,874 | 7/1888 | Foltz | 40/159 |
| 2,127,940 | 8/1938 | Rinn | 40/159 |
| 2,296,272 | 9/1942 | Sherbinin | 40/159 |
| 2,701,426 | 2/1955 | Vlock | 40/159 |
| 3,150,457 | 9/1964 | Thieme | 40/152 |
| 3,277,598 | 10/1966 | Lightburn | 40/158 R |
| 3,419,987 | 1/1969 | Hipp | 40/152 |
| 3,543,426 | 12/1970 | Sakamoto | 40/158 B |
| 3,797,152 | 3/1974 | Brandt | 40/159 |
| 3,808,722 | 5/1974 | Byers et al. | 40/159 |
| 3,842,525 | 10/1974 | Deau | 40/159 |
| 3,981,092 | 9/1976 | Ramsdale | 40/158 R |
| 3,996,683 | 12/1976 | Hanke | 40/158 B |

*Primary Examiner*—John F. Pitrelli
*Assistant Examiner*—G. Lee Skillington

[57] ABSTRACT

Compartments are arranged in a fixed frame and defined by a front cover sheet and a rear cover sheet spaced apart in the vicinity of the compartments by a substantially greater distance than the thickness of the picture. Insert openings extend in the insert direction along an inclined plane. Lateral guides are spaced by the width of the picture frame and a stop defines an end position for the picture. The two cover sheets have parallel recesses adapted to the picture size.

4 Claims, 6 Drawing Figures

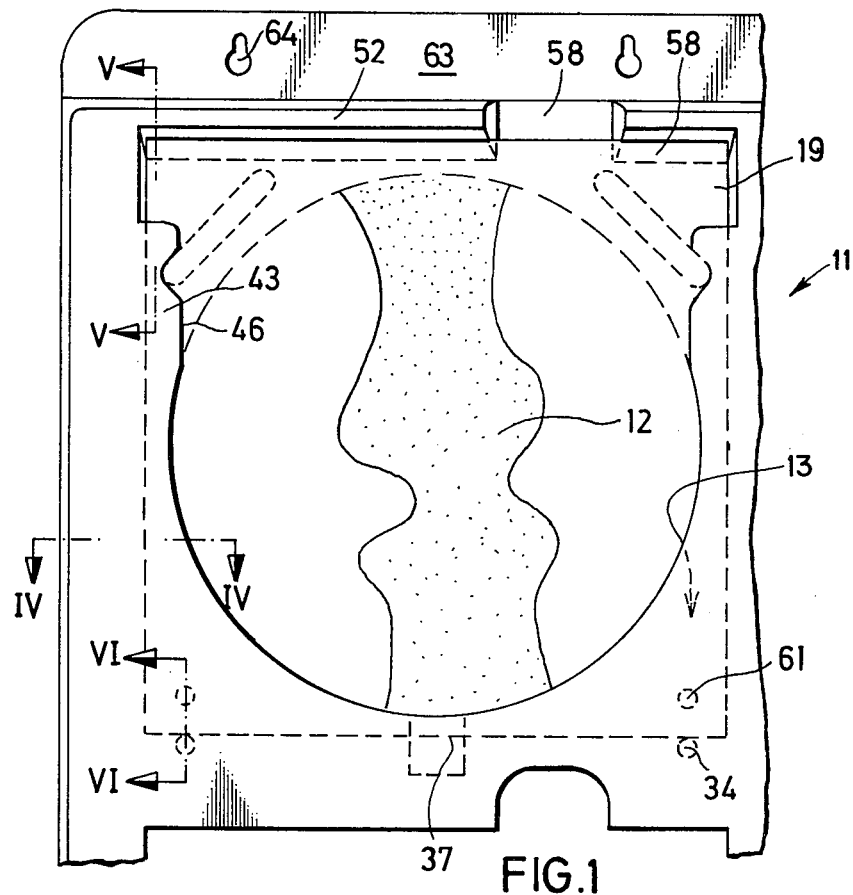
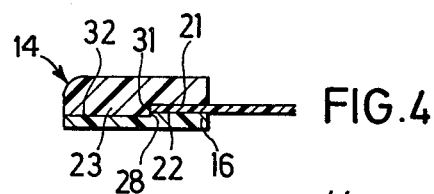
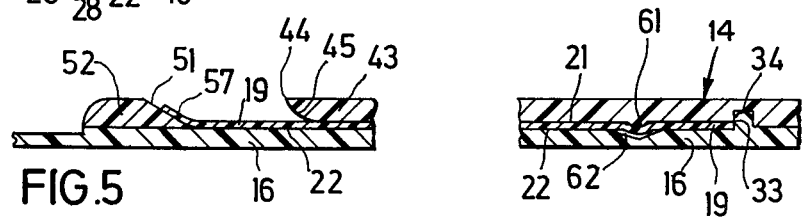
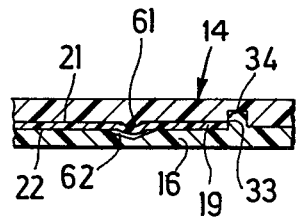

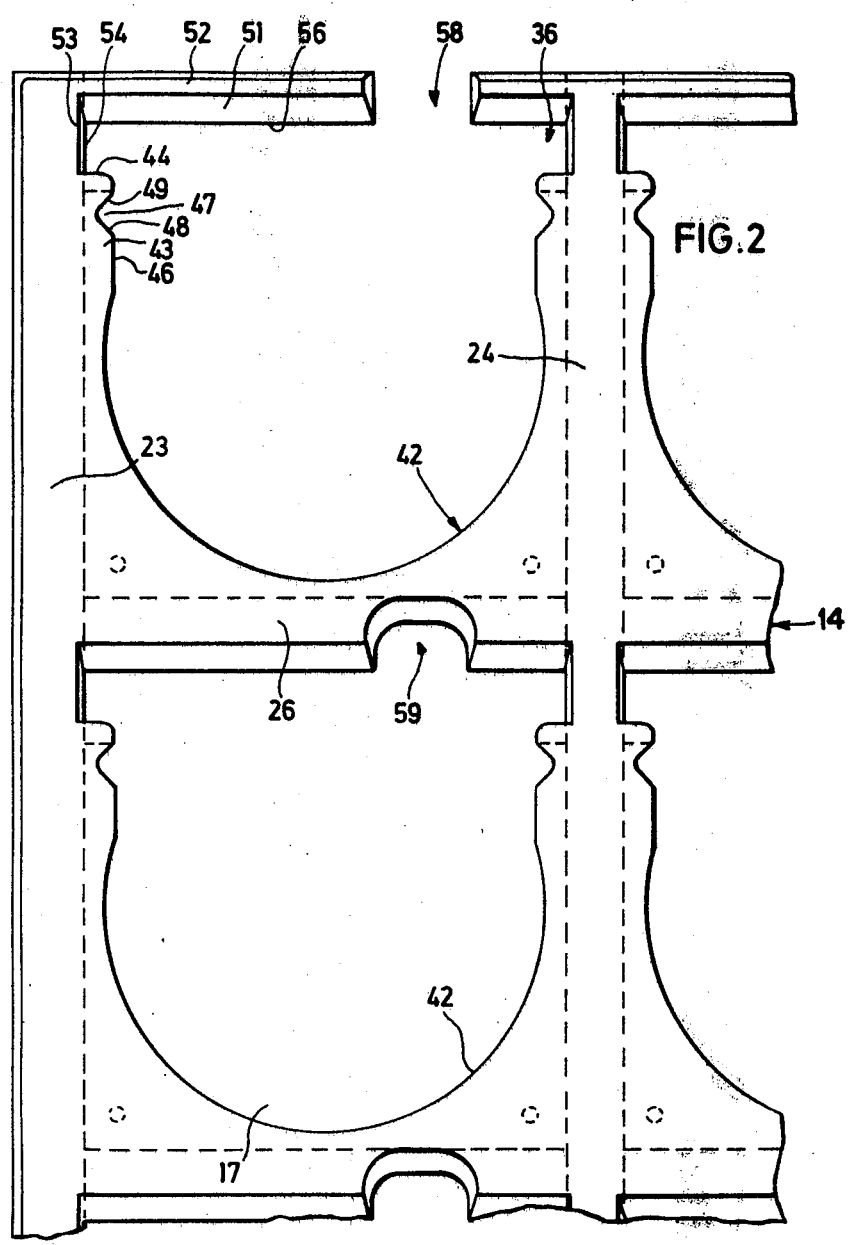

APPARATUS FOR JOINTLY EXAMINING AND DEPOSITING A PLURALITY OF TRANSPARENT PICTURES

This is a continuation of application Ser. No. 723,703, filed Sept. 16, 1976, now abandoned.

The invention relates to an apparatus for jointly examining and/or depositing a plurality of transparent pictures or images of a given size, such as photographs produced on negative or diapositive film, which photographs are inserted in pocket-like compartments arranged in a longitudinal and transverse frame and viewed in front of a flat or planar source of light such as a focusing screen illuminated from the rear and, if necessary after sorting out unusable pictures, are deposited until required for use again.

Such apparatus is required particularly for the comparative examination and safe keeping of series of photographs which have been prepared for medical/diagnostic purposes. These series of photographs are prepared during gastroscopic, laparoscopic, colposcopic and radiographic examinations, either different parts of the stomach, liver, intestine or other organs and parts of the body being photographed or even the same part of an organ being photographed at repeated time intervals to enable the course of a disease to be pictorially recorded and followed. Also it may be desirable for demonstration purposes, for example in the event of lectures and talks, to be able to present simultaneously photographs which have been taken of different patients having the same or similar organic changes.

If such photographs are prepared for diagnostic purposes, substantially more photographs are usually taken than required eventually since these photographs are frequently taken by medical auxiliary personnel such as technical assistants or nurses and a final selection and evaluation is left to the doctor who then also has to decide which pictures are to be kept for the patient's medical history and for possible further use.

At all events it is necessary for the essential details of the photographs to be easily discernible since the doctor often has to derive the important information from only slight differences in these pictures. Moreover, it is necessary for the pictures to be well protected when stored so that, should they be compared with a later series of photographs, they are prevented from being damaged and reproduce the entire information content of the date when they were taken.

It is known practice to use, for the initially mentioned purposes, transparent envelopes or wrappers which are created by pocket-shaped compartments with intersecting welds parallel to the edges of the wrappers, into which compartments the individual pictures can be inserted through slits.

These transparent jackets have the following disadvantages:

(a) The width of the pockets has to be distinctly greater than that of the normally rectangular or square picture or carrier size in order that the pictures may be fairly easily slipped into the pockets and their corners prevented from catching on the usually irregularly defined seams. There must therefore be a certain safety margin extending beyond the width of the seams and necessitating a picture element of relatively large size.

(b) A great amount of light can pass through the broad transparent zones between individual pictures, the zones being determined by the large size of the picture element, if the pictures are being compared simultaneously in front of a focusing screen of, for example, an X-ray viewer so that the viewer is dazzled or at least the eye of the viewer is adapted to an excessive brightness which can result in slight variations in brightness no longer being noticed on the pictures which may nevertheless be essential for evaluation.

(c) In such a transparent jacket in which the pictures are arranged between two transparent sheets so that a "sandwich" is formed in which a rear sheet is followed by a first thin layer of air, the photographic image produced on a carrier sheet, a second thin layer of air and the remaining top sheet, each of which in this order has a different refractive index, reflections of light which disturb observation are however unavoidable so that in practice it is always necessary to remove the pictures from the pockets in order that all their details may be discernible.

(d) If however the pictures have to be removed from the pockets with which they are flatly in contact at least in sections, there is the danger that they may in this case be split and scratched. Moreover, it is inconvenient and time-consuming to remove the pictures for viewing and re-insert them for storage.

(e) If the pictures are stored between sheets, there is also the danger of condensation forming which can lead at least to marks or spots forming on the pictures.

Accordingly, the problem for the invention is to provide a frame-like apparatus of the initially described type which, through optimum use of the frame surface, enables clear viewing of the pictures without the latter having to be removed from the frame, the pictures also nevertheless having optimum protection without the use of cover sheets, being easily removable and replaceable and storable in the frame without the risk of damage.

This problem is solved in accordance with the invention in that the compartments are arranged in a fixed frame and defined by a front cover sheet (i.e., cover plate) directed towards the viewer and a rear cover sheet of the frame directed towards the light source, the thickness of said cover sheets being greater than the thickness of the picture carrier, (i.e., film) the sheets being spaced apart in the vicinity of the compartments by a distance substantially greater than the thickness of the picture carrier, and in that the compartments comprise insert openings which extend in the insert direction inclined to the plane of the frame and lead into lateral guides which are spaced by the width of the picture carrier and along which the pictures can be inserted into and removed again from the compartments between parallel recesses in the two cover sheets adapted to the picture size, until an end position defined by a stop is reached.

The picture are then arranged in a central plane of the frame, the distance between the pictures and the front or rear limiting face of the frame being equal in each case to the thickness of the cover sheets. They are therefore also protected against scratches when the frame is laid down and moved back and forth on the bearing surface.

The protected arrangement of the pictures in an inner plane of the frame makes it possible to dispense with additional cover sheets so that reflections of light which interfere with viewing are eliminated and the pictures can be examined in the frame.

Furthermore, the largely rigid design of the frame enables a picture element size which is only slightly greater than the width of the picture carrier size, i.e. the lateral guides of adjacent pictures can be spaced by a very short distance from one another which can be equal to e.g. the width, required for minimum stability, of a rib projecting from the front or rear cover sheet between the compartments so that the entire frame can be made with substantially smaller linear dimensions than the transparent sheets. It is easily possible that the size of a frame designed to receive six pairs of pictures of 10×10 cm size arranged one below the other is, at least when laterally extended, no greater than the size of a conventional document folder or file so that such a frame can also be deposited in the file of a patient. Finally, the lateral guides of the compartments ensure that the pictures can be conveniently inserted into and removed again from the frame without being pressed or bent.

The photographs are usually rectangular, the size of the carrier being slightly greater than the picture size which is determined by the exposed surface of the film and is basically any desired size so that the pictures are enclosed on all sides by a more or less broad marginal strip.

For viewing the pictures it is possible to use a conventional X-ray viewer with a vertically arranged focusing screen in front of which the frame is retained by a suitable clamping device.

The frame can then be designed such that the insert openings of the frame are designed as longitudinal slits in one of the two sheets extending above the parallel recesses in the cover sheets transversely to the insert direction and over the width of the carrier, the upper limiting walls pointing towards the other sheet inclined at a low angle from the outside of the sheet in the insert direction; the lateral guides in such a frame can comprise the parts of the cover sheets covering the edges of the photographs, together with distance pieces (i.e., spacing means) which are distributed along the lateral edges of the compartments. Likewise, the stop for limiting the insert movement can comprise one or several distance pieces which are distributed along the lower edges of the compartments and which, together with the distance pieces of the guides, maintain the cover sheets at the said distance from one another which is greater than the thickness of the photographs, which cover sheets can be bonded together in the vicinity of adjacent faces.

The photographs are then introduced into the lateral guides through the insert slit and moved down between the sheets until they reach their final position which is defined by the stop and in which the non-illuminated parts of the photographs are covered by the sheets on at least one side.

Even when the non-illuminated marginal sections of the photographs in this final position were covered by the cover sheets on both sides, the pictures which are arranged in the compartments with a certain degree of clearance on account of the relative spacing between the sheets could be easily removed again from the said compartments in such a manner that they could be touched on a marginal area of negligible size on the part of the photograph freely accessible through the recesses and moved back into the insert opening, which could also be done by gripping the photograph on one side and applying slight pressure, until they could be gripped on the edge and drawn out further. However, there is then again the danger that finger-prints may be left on the exposed area of the photographs.

It is therefore advantageous if at least one of the sheets comprises a recess leaving a marginal section of the carrier open for the removal of the picture. This recess also facilitates the insertion of the pictures in their final or end position.

Such a recess can be provided at the same height, for example, on one or both of the lateral edges of the compartments or in a staggered arrangement one above the other or even in the area of the insert opening, for example on the lower edge thereof.

It is particularly advantageous if, on its underside facing the recesses in the cover sheet, the insert opening is defined by short webs on the front sheet directed towards the viewer, the said webs extending from the side over only a small part of the width of the picture carrier, and if the picture carrier is maintained at a distance from the rear cover sheet in a marginal area provided between the webs, which can be achieved for example because the rear sheet comprises a flat recess in the area between the webs on the front sheet. The viewer can then grip the edge of the carrier in this recess and easily remove the picture.

This easy and convenient use of the frame is made possible in accordance with an embodiment of the invention if the distance between the inner edge, facing the recesses, of the inclined face limited on its top side by the insert opening and the bottom stop is less than the length, measured in the insert direction, of the carrier size by part of the width of the non-illuminated edge of a photograph, and if the recess is arranged at the upper limit of the insert opening in the area between the webs. When the photograph is fully inserted into the compartment, its upper edge is still slightly higher than the rear stop face of the compartment so that in the vicinity of the recess it is maintained at a spacing which increases in an upward direction. In this case the recesses can be designed at the upper edge of the frame so that the upper limit of the insert opening is interrupted over part of its width or, when the insert compartments are arranged below, designed as a downwardly open U-shaped recess in the upper edge of the insert opening, which recesses can also comprise upwardly sloping edges so that they broaden outwardly.

This arrangement and design of the recess has the added advantage that the length of the compartments is minimized since then also the area of the insert opening may be used for viewing the pictures.

Since the upper edges of the photographs having a certain resistance to bending in this embodiment of the invention are bent slightly upwardly in the area of the insert opening, the photographs are subject to a certain degree of flexible stress which maintains the pictures in their position so that, if the frame is turned round, they cannot fall out of the compartments. However, in cases where the frame only covers very narrow marginal sections of the photographs, this stress can lead to the photographs jumping out of the frame as a result of a vibration. Therefore, at least in the case of frames for receiving pictures which are only negligibly smaller in size than the carrier, it is advantageous if in accordance with a further embodiment of the invention there are provided additional retaining means for keeping the picture clamped in the frame. In this connection is advantageous in accordance with a further embodiment of the invention if the retaining means engage on a section of the picture carrier directed away from the insert opening so that removal of pictures is slightly difficult only over a short distance when first gripping the picture.

These retaining elements can be designed for example in the form of slightly curved plate springs which are provided in one or both of the cover sheets in the vicinity of the guides and keep the picture carriers clamped in position in a manner which is known in reversible frames. With cover sheets made of plastics material there can also be provided resilient lobes molded so as to be integral with the frame sheets. These lobes would however call for complicated molds and molding tools which may however be advantageously avoided if the flexible properties of the actual carrier material are used for mounting the pictures, which may be simply achieved in accordance with an embodiment of the invention if the first cover sheet comprises dome-shaped elevated faces projecting from its inner face and the second cover sheet recesses of slightly greater diameter which are arranged opposite these elevated faces, their depth or height being equal to at least the distance between the cover sheets. The flexible carrier material is then bent slightly into the recesses when inserted in the compartments, thereby securing the photograph against the slightest pull. This design of the retaining means enables the cover sheets to be made of plastic with simple molding tools, the retaining elements being considerably more solid in design than resilient plastic lobes with which, moreover, there would be the danger that they might catch and as a result break on a perforated edge, if any, of the photographic film material.

As already mentioned, the guides can comprise inter alia distance pieces which are arranged on the inner sides of the cover sheets facing the compartments and can be provided on both the first and second cover sheets. In this connection it is in turn advantageous with cover sheets made of plastic, in view of the simple design of the molding tools, if the distance pieces, for example reinforcing ribs extending over the length the cover sheets, are arranged between the compartments on only one of the sheets and supported on the inner face of the other sheet. It may then happen that during insertion the photographs pass into a gap between the distance pieces of one sheet and the inner face of the other sheet and may be damaged as a result, particularly since relatively thick plastic sheets still have a certain flexibility in bending which enables the spacing between the sheets to be increased at least in the center of the frame if the cover sheets are not rigidly connected at all points between the compartments.

It is therefore advantageous if the distance pieces have a height slightly greater than the desired spacing between the cover sheets and engage, with one section in height, in recesses of complementary shape in the oppositely lying sheet. In the event of the frame bending which is a normal occurrence, the distance pieces cannot then move out of these recesses, and also no gap can form between the cover sheets if the photographs are pressed laterally against the guides.

It is also advantageous if one of the cover sheets of the frame, preferably that which is arranged on the underside of the frame when the latter is normally deposited, comprises supporting feet arranged in the corners of the frame, and the upper cover sheet comprises on its outer side recesses superposably arranged with and adapted to suit the shape of the supporting feet, into which recesses the supporting feet of a second frame stored above can engage, etc., so that a larger number of stacked-up frames can be prevented from sliding against one another during transport.

To achieve a minimum stacking height, the height of the supporting feet can be less than or equal to the depth of the recesses. It can however be advantageous for the height of the supporting feet to be somewhat greater than the depth of the recesses so that between the individually stacked frames there remains an intermediate space or gap which facilitates removal and moreover ensures that no condensation can form in the area of the compartments if the frames remain in a stacked condition for a relatively long time.

The sheets can be made from all kinds of plastics which are suitable for cold forming or thermoforming, drawing and/or compressing, injection molding, casting or foaming in accordance with a great variety of conventional processes in the plastics industry, in which case it can be advantageous to arrange the insert opening with its inclined limiting surfaces, the distance pieces and the dome-shaped elevated faces of the retaining elements on the same sheet and produce these in accordance with a process and from a material which permits a particularly solid design for the sheet, for example make this sheet from a plastic material suitable for injection molding. The other sheet can then be simply manufactured from a thin film in accordance with the deep-drawing process or even processed from a foam material having a low foam density, as proposed in accordance with an embodiment of the invention, in order that the entire frame may be as light as possible.

At all events it is advantageous to make the frame, or at least one of the cover sheets, preferably that which is not provided with the insert opening, from a non-transparent material so that light which might dazzle the viewer is prevented from passing between and through the individual compartments.

The use of the frame can also be facilitated by providing the rear cover sheet directed towards the light source with a thin marginal section which extends over the upper limiting edge of the front cover sheet and by which the frame can be clamped on a clamping device of the viewing arrangement. The frame can then be used in combination with a conventional viewing equipment, such as is used for example for viewing X-ray photographs. To prevent the frame from slipping when the rear cover sheet is made of a smooth material, the thin section of the edge can be provided with a thin transverse rib which is gripped at the rear by a clamping device. Alternatively, it is possible to roughen the edge section so that it adheres well to a flexible rubber coating on the clamping device.

The two cover sheets of the frame are normally rigidly connected and glued or welded together depending on the type of material from which they are made. However, in order that at least one of the cover sheets may be further used if the other sheet is damaged, it may also be advantageous if the two cover sheets are rigidly connected so as to be detachable, for example by means of screws extending through the rear cover sheet and screwed into threads in the usually somewhat thicker front cover sheet. In the case of sheets made of plastic material it is also easily possible to provide press stud-like connections which enable particularly rapid changing of a damaged sheet and can be designed in such a manner that one of the cover sheets comprises round pins projecting from its inner side and being slotted in their longitudinal direction, the ends of said pins comprising projections which engage in the rear of a groove of holes in the other cover sheet into which they can be inserted.

Other details and features of the invention are evident from the following description of a practical embodiment with the aid of the drawings.

FIG. 1 shows a partially fragmented view of a frame according to the invention for viewing photographs, comprising front and rear cover sheets, FIG. 2 shows, in partially fragmented plan view, the front cover sheet of the frame according to FIG. 1, FIG. 3 shows the same partially fragmented view of the rear cover sheet of the frame according to FIG. 1, FIG. 4 is a section along the line IV—IV shown in FIG. 1, FIG. 5 is a section along the line V—V shown in FIG. 1, and FIG. 6 is a section along the line VI—VI shown in FIG. 1.

The frame 11 shown in FIG. 1 is used for the simultaneous comparative examination of 6 transparent photographs, such as X-ray photographs or photographs 12 made with the aid of a laparoscope or the like on negative or positive film, in front of a conventional X-ray viewer (not shown) comprising a vertically mounted focusing screen illuminated from the rear side.

The frame is rectangular in design and symmetrical with a longitudinal central plane running perpendicular to the plane of the frame and comprises three pairs of superposed pocket-like compartments 13 for inserting the photographs 12 of which the insert pocket arranged at the top left corner of the frame 11 is fully illustrated in FIG. 1.

The insert pockets 13 are defined by a rectangular front cover sheet 14 facing the viewer and shown in FIG. 2, and by a rectangular rear cover sheet directed towards the light source and shown in FIG. 3, which cover sheets comprise apertures and 17, 18 adapted to the size of the picture, for exposing and viewing the photographs, the edges of the apertures 17, 18 being designed in alignment at least in sections. The shape of the apertures is adapted to a circular picture size having a diameter of 9 cm, as is achieved with gastroscopic, laparoscopic and colposcopic photographs where a circular field of observation is transmitted to a camera with the aid of fibre light guides while the insert pockets 13 are adapted to the 10×10 cm size of the picture carrier 19 which is the normal size for such photographs.

The front and reverse sides of the insert pockets 13 are defined by the inner faces 21 and 22 of the front and rear cover sheets 14 and 16 which are spaced apart by distance pieces 23, 24 and 26, running parallel to the edges of the insert pockets 13, by a distance which is approximately 2 to 3 times greater than the thickness of the picture carrier 19.

The rear cover sheet 16 shown in FIG. 3, which is approximately 3 mm thick, comprises a marginal fold 27 approximately 15 mm wide and 2 mm thick, which surrounds the sheet on all sides and whose surface facing the front cover sheet 14 is staggered back in relation to the inner face 22 of the rear cover sheet by the difference of approximately 1 mm in thickness so that its outer edges are lowered relative to the fold 27 by a stepped face 28, approximately 1 mm high, running perpendicular to the plane of the sheet. Moreover, the rear cover sheet 16 comprises a flat groove or channel 29 running along its axis of symmetry, approximately 10 mm wide and 1 mm deep with a rectangular cross section, the distance between the outer stepped face 27 and each adjacent flank of the groove 29 being equal to the width of the picture carrier 19.

The front cover sheet 14 comprises reinforcing ribs of rectangular cross section forming distance pieces 23 and 24 which run from the inner sheet face 21 along both its lateral edges, along its bottom edge as well as along its axis of symmetry, the height of the said ribs measured perpendicular to the inner sheet face 21 being slightly greater than the depth of the groove 29 or height of the stepped face 28, reduced by the thickness of the picture carrier, by means of which distance pieces the front cover sheet is supported on the fold 27 and the bottom of the groove 29. The reinforcing ribs 23 and 24 are designed so that their narrow longitudinal faces 31, projecting vertically from the inner face 21 of the front cover sheet 14, lie flush against the outer stepped faces 28 or flanks of the groove 29 and thus laterally define the insert pockets 13.

The undersides of the insert pockets 13 are defined by the distance pieces 26 projecting from the inner face 21 of the front cover sheet 14 and likewise designed as reinforcing ribs whose height is still less than the height of the ribs 23 and 24 parallel to the longitudinal edges of the frame 11 by the depth of the groove 28 or height of the stepped face 28. The transversely running reinforcing ribs bear, with a supporting surface 32, directly against the inner face 22 of the rear cover sheet 16.

To prevent a photograph from being slipped between the inner face 22 of the rear sheet 16 and the bearing surface 28 of the front sheet 14, on the inner edge of this bearing surface there are provided stops 33 which are arranged at a distance from the lateral edges of the insert pockets 13 symmetrically with the center line thereof and designed in the form of short round studs projecting from the rear sheet 16 into oppositely lying recesses 34 in the front cover sheet 14.

The photographs 12 are inserted in the pockets through an insert opening 36 on the front cover sheet 14 arranged at the upper edge of the pockets 13 and moved along the guides which comprise the vertically projecting longitudinal faces 31 of the reinforcing ribs 23,24 and marginal sections of the inner faces 21,22 of the cover sheets 14,16, until their bottom edges come into contact with the stops 33 and/or the inner edge of the transverse reinforcing ribs 26, in which position the non-illuminated parts of the photographs are covered by at least one of the sheets 14 and 16.

The rear cover sheet 18 comprises for each pocket a circular aperture 18 which has, in the center of its bottom edge, a rectangular recess 38 extending up to and beyond the bottom edge 37 of the picture carrier 19. This recess 38 is provided to enable the photographs to be removed from the insert pockets 13 with an automatic device.

In the top corners of each insert pocket 13 on the rear cover sheet 16 there are provided slots 39 and 41 running at 45° to the center line of the pockets and arranged symmetrically thereto, this area showing sections of the photographs 12 on which information can be recorded either in handwriting or by photographic means about the patient photographs of whom have been taken and/or about the organs represented on the photographs or the nature of the disease, etc.

In the case of the front cover sheet 14 shown in FIG. 2, the aperture 17 which permits a clear view of the photograph is approximately U-shaped and symmetrical with the center of the pockets, its arched bottom edge 42 enclosing angle of slightly more than 180°. In the area following the arched edge section 42 the U-shaped aperture 17 is defined by narrow marginal webs 43 with edges parallel to the longitudinal sides of the pockets 13 and comprising an upper edge 44 at right angles to the side walls 31 of the insert pockets 13 and limiting the insert opening 36 at the bottom. The webs 43 are provided with a face 45 which extends from the upper edge 44, is convexly curved in the direction of the rear cover sheet 16 and facilitates insertion of the photographs 12 into the insert pockets 13. Between the upper edge 44 and the arch-shaped edge 42 of the recess 16 the webs 43 comprise recesses 47 extending from their inner edges and having edges 48,49 running at right angles to one another to form a V shape and following the outer edge sections of the slots 39 and 41.

On their upper sides lying opposite the webs 43, the insert openings 36 are defined by a face 51 inclined in the insert direction, which face is arranged, in the case of the uppermost pair of insert pockets, on a narrow horizontal side 52 of the front cover sheet 14 and, in the case of the insert pockets below, on the parts of the front cover sheet left between the apertures 18 and enclosing the transverse reinforcing ribs 26. Also on the longitudinal sides the insert openings are defined by inclined faces on the sections of the front cover sheet 14 reinforced on the underside, the inner edges 54 lying flush with the upper edges of the vertical stepped faces 28 of the rear cover sheet 16.

The lower edge 56 of the upper inclined face 51 bearing on the inner face 22 of the rear cover sheet 16 runs parallel to the upper edge 44 of the webs 43 and is spaced from the lower end of the insert pockets 13 by a distance which is slightly less than the length of the picture carriers 19 so that the upper edge section 57 still bears against the inclined face 51 and extends slightly higher than the inner stop face 22 of the rear cover sheet 16 when the photographs 12 are inserted in the pockets 13.

The picture carrier which is usually made of a flexible bending material such as celluloid is then subject to a flexible stress which is caused by bending of the carrier at the transition point between the inclined face 51 and rear cover sheet 16 and maintains the carrier in contact with the stops 33.

The upper limit of the insert openings 36 comprises a recess 58 or 59 which is arranged laterally of the center of the insert pockets 13 in the area between the narrow marginal webs 43 and which, in the case of the uppermost pockets, are designed as a perforation or opening 58 in the narrow side 52 of the frame and, in the case of the pockets arranged below, as a downwardly open U-shaped recess in the reinforced sections 26 of the front cover sheet. The upper marginal section 57 of the picture carriers 19 in contact with the inclined face 51 is spaced, in these recesses, from the rear cover sheet 16 such that it can be easily gripped for removal. The edges of the recesses 58 and 59 are likewise bevelled so that the recesses broaden outwardly.

In the lower corners of the insert pockets 13, on the inside of the front cover sheet, there are provided dome-shaped elevated faces 61 the height of which is equal to at least the distance between the inner sheet faces 21 and 22. These dome-shaped faces are associated with tapered recesses 62 on the inside 22 of the rear sheet 16 into which the picture carrier 19 is pressed in an undulatory manner when the photographs 12 are inserted. The carrier then comes, under a certain degree of bending stress, into contact with the elevated faces 61 and parts of the recesses 62 which as a result act as additional retaining elements.

An upper edge strip 63 of the lower cover sheet 16 projecting over the edge of the front cover sheet 14 is provided for mounting the frame 11, whose cover sheets 14 and 16 are firmly glued together on their opposite stop faces, the said edge strip being provided with openings 64 by means of which the frame can be suspended from hooks or projections on the viewing equipment.

In addition the edge strip 63 is roughened in order that it may adhere well to a flexible rubber coating on a clamping device used if necessary for mounting the frame.

There can also be provided supporting feet arranged on the reverse side of the rear cover sheet 16, approximately in its corners, and recesses arranged correspondingly on the front side of the front cover sheet 14 and adapted to the diameter of the supporting feet, into which recesses the supporting feet of a frame arranged above can lock so that a plurality of frames can be stacked up without any risk of slipping.

The viewing and storing of a plurality of photographs taken for diagnostic or demonstration purposes is considerably facilitated and rationalized by the frame according to the invention particularly since the frame can also be used in combination with automatic framing and sorting equipment by means of which the photographs can be automatically removed from the frame and sorted and, if necessary, remounted for further use in accordance with a predetermined system.

What I claim is:

1. Apparatus for easily automatically and manually exchanging while readily retaining for jointly viewing, a plurality of transparent films in the vicinity of 10 CM×10 CM in size in front of a flat or planar light source such as a focusing screen, illuminated from the rear side, comprising; substantially planar frame means having front and rear cover plates of thermoplastic material defining pocket-like compartments arranged longitudinally and transversely therein, said plates being thicker than the film and being spaced apart in the area of said compartments by a distance several times greater than the thickness of the film and providing lateral guide means in said compartments spaced apart laterally by the width of the film and arranged and adapted for insertion and removal of a film therealong, stop means defining an end position for insertion of the film, said front cover plate and said rear cover plate having apertures adapted to the picture size of the film and aligned with each other, said apertures being free of glass and other facing and backing and at least partly arch shaped at their lower edges, said frame means having insert openings which extend on an inclined to the plane of said frame means and lead into said lateral guide means, narrow webs on said front cover plate extending at the sides of said compartments to overlap a small portion of the film and defining the side of said insert opening towards said apertures of said cover plates an inclined face on said frame means defining said insert opening on its upper side, said inclined face commencing from said rear cover plate without a stop or other blocking barrier to a position above the upper edge of a fully inserted film, the distance between the lower stop means and the inner edge of said inclined face being less than the length of the film, measured in the insert direction, by part of the width of the unexposed edge of the film so that said inclined face of the frame portion cooperates with said stop means to bend the upper portion of the film in its fully inserted position at the transition between said inclined face and said rear cover plate to readily retain the lower portion of the film in contact with said stop means, said frame portion which defines the insert opening at its upper side having a recess in it which maintains an edge of the film free and at a distance from said rear cover plate for easy removal of the film from said compartment, and one of said cover plates having a lower recess extending upwards into its aligned aperture for easy movement of the film, which recess is shielded by the other cover plate and extends below the stop means.

2. Apparatus as claimed in claim 1 comprising
retaining elements for keeping the films clamped in said frame means,
said retaining elements engaging with the film carrier in the vicinity of the end thereof directed away from said insert opening and comprising dome-shaped elevated faces projecting from said rear cover plate and recesses of slightly larger diameter arranged on said front cover plate opposite said elevated faces, the height of the said recesses being equal to at least the distance between said plates.

3. Apparatus as claimed in claim 1 comprising
spacing means which space said cover plates arranged on one of said cover plates, said spacing means having a height slightly greater than the desired spacing between said cover plates, and recesses of complementary shape in the oppositely lying cover plate, engaging with said spacing means.

4. Apparatus as claimed in claim 1 in which at least one of said cover plates is made from a foam material having a low foam density.

* * * * *